Figure 1:
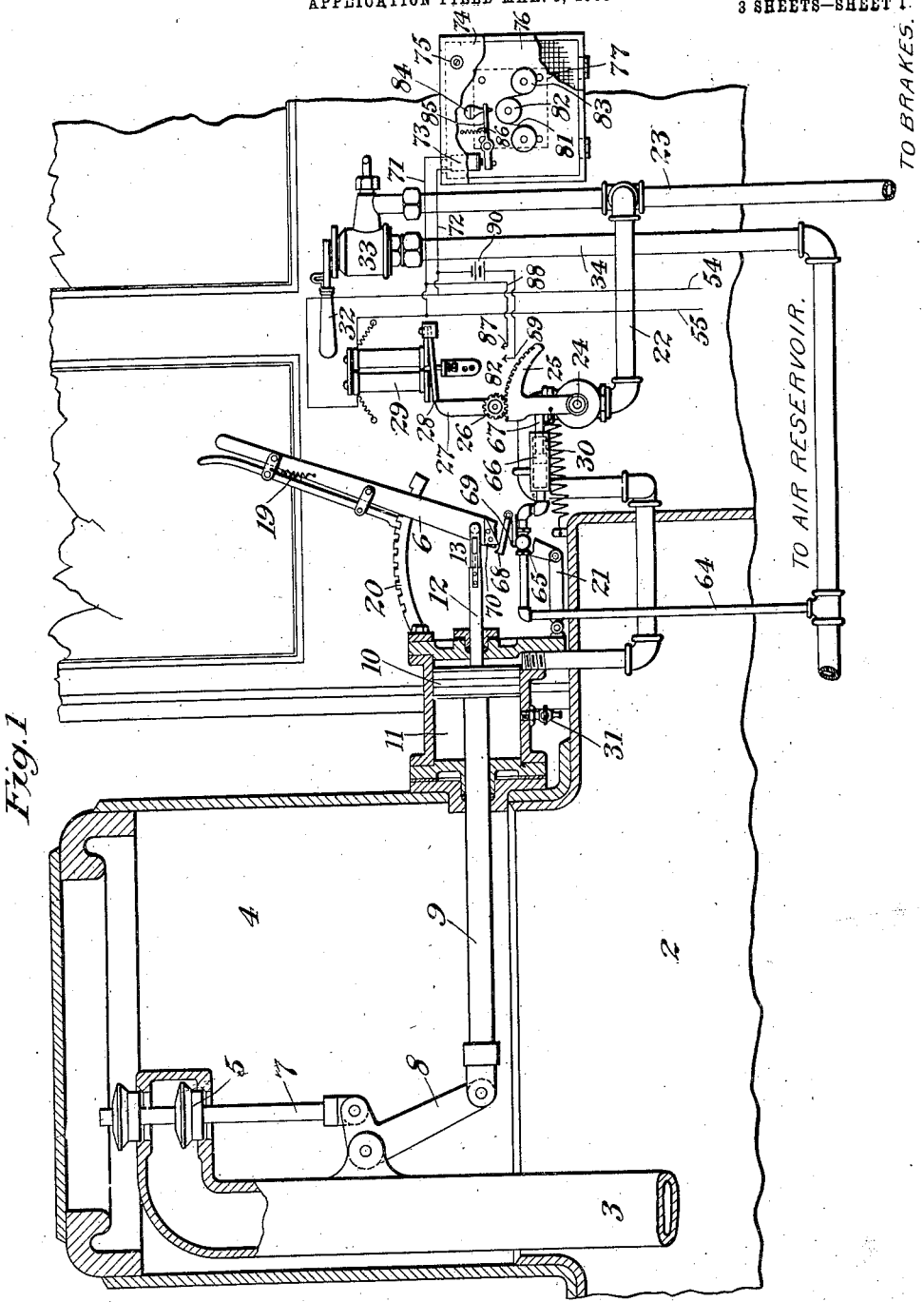

No. 836,120. PATENTED NOV. 20, 1906.
F. E. KINSMAN.
MEANS FOR CONTROLLING THE MOVEMENTS OF A VEHICLE ON A LINE OF WAY OR RAILWAY.
APPLICATION FILED MAR. 6, 1905.

3 SHEETS—SHEET 1.

Witnesses:
Chas. D. King
R. Champion

Inventor:
Frank E. Kinsman,
by
Atty.

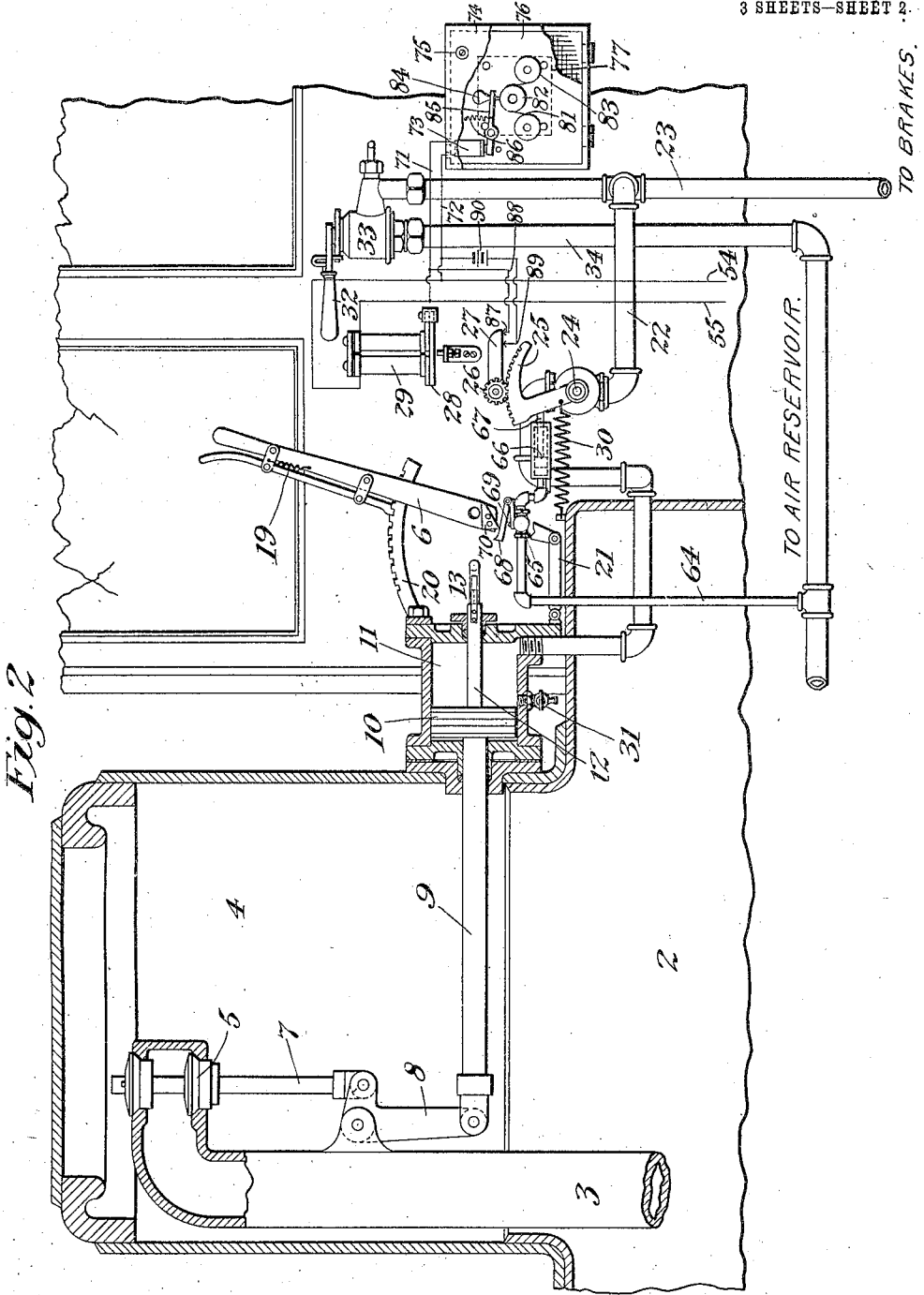

No. 836,120. PATENTED NOV. 20, 1906.
F. E. KINSMAN.
MEANS FOR CONTROLLING THE MOVEMENTS OF A VEHICLE ON A LINE OF WAY OR RAILWAY.
APPLICATION FILED MAR. 6, 1905.
3 SHEETS—SHEET 3.
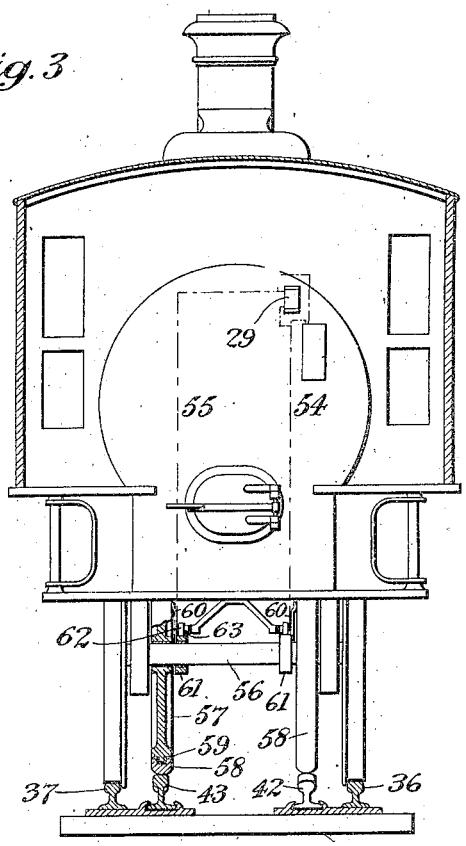
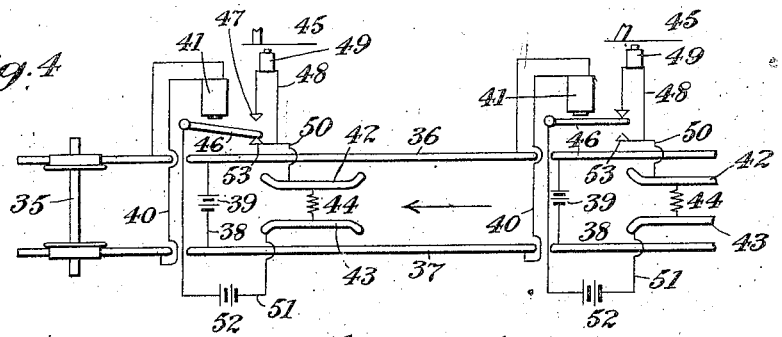
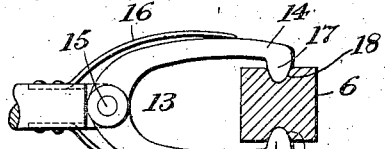
Witnesses:
Chas. D. King
R. Champion
Inventor:
Frank E. Kinsman,
by Champion
Atty.

UNITED STATES PATENT OFFICE.

FRANK E. KINSMAN, OF PLAINFIELD, NEW JERSEY.

MEANS FOR CONTROLLING THE MOVEMENTS OF A VEHICLE ON A LINE OF WAY OR RAILWAY.

No. 836,120.  Specification of Letters Patent.  Patented Nov. 20, 1906.

Application filed March 6, 1905. Serial No. 248,532.

*To all whom it may concern:*

Be it known that I, FRANK E. KINSMAN, a citizen of the United States, and a resident of Plainfield, in the county of Union and State of New Jersey, have invented certain new and useful Improvements in Means for Controlling the Movements of a Vehicle on a Line of Way or Railway, of which the following is a specification.

This invention relates to means for controlling the movements of a vehicle on a line of way or railway, and especially to a system for automatically controlling and stopping the movement of a locomotive or other vehicle when there is a danger condition ahead of the same, the present invention being especially designed and intended as an improvement upon the automatic train-stopping system disclosed in prior patents granted to me.

One of the principal objects of this invention is to provide controlling apparatus in which an element of the automatic controlling means is normally connected to a manual controller, such as the throttle-lever of an ordinary locomotive, but is releasable from such manual controller or throttle-lever when there is an automatic or emergency operation of the controlling means as the result of the presence of such a danger condition on the line. In connection with an automatic controlling device of this type I also make use of suitable means for resetting the automatic controlling means either after the vehicle has been stopped or after the engineer or motorman has decided that he can safely proceed at reduced speed.

In using automatic controlling or train-stopping apparatus of the general type disclosed herein and in my prior patents it is important to make use of some means for recording the operations of the automatic controlling means, and thereby obtaining a permanent record of the conditions at different points on a railway traversed by a vehicle or train. This record should include not only an indication of the fact that one or more applications of the automatic controlling means have occurred and that there have been no applications of the automatic controlling means at other points, but also the time at which such automatic controlling action or actions occur and the length of time elapsing before the resetting of the automatic controlling means in its normal position. This record, showing the length of time between the operation of the automatic controlling means and the resetting thereof, is very much modified when the resetting means is of such construction as to be capable of instant actuation by the engineer or motorman, and the operation of the recording mechanism is therefore not only governed by but very greatly modified by resetting means capable of being operated without loss of time to restore the automatic controlling means to its normal condition when the condition of the track is such as to render it safe for the engineer to operate such resetting mechanism and proceed without bringing his train to a full stop. It has been found in practice that this is one of the essential conditions of railroading where trains are operated at high speed under short headway and that when trains are so operated it is of the utmost importance that the engineer or motorman shall be permitted to proceed the instant it is safe for him to do so after stopping or to proceed under reduced speed without stopping at all if it is safe for him to do so, as is frequently the case. In all such cases, while the engineer or motorman is relieved of practically all responsibility so far as the controlling of his train by a danger condition on the line is concerned, he is not relieved from responsibility if he proceeds with his train before it is safe for him to do so. By means of my improved recording mechanism a permanent record will be made not only of the fact that the automatic controlling means has been operated as the result of the presence of a danger condition on the line, but also of the time at which such automatic action occurs, and the length of such record will indicate just how long a period of time elapses between the application of the automatic controlling means and the resetting thereof. The record made on the recording medium may also be of such a character as to disclose every fact necessary to determine not only when such automatic action takes place and when the resetting occurs, but also the exact point on the line at which these actions are effected, the exact interval of time separating them, the distance traversed by the train during such interval, and the approximate speed of the same, &c.; but the means for accomplishing these results are not described or claimed herein, as they constitute subject-matter of another application which will shortly be filed by me.

Other features of my invention not hereinbefore referred to will be hereinafter described and claimed and are illustrated in the accompanying drawings, in which—

Figure 1 is a sectional side elevation of a portion of a locomotive-cab, illustrating my present invention adapted for use with a compressed-air-brake system and shows the automatic controlling means in the normal position. Fig. 2 is a similar view illustrating the automatic controlling means in its working position with the brake system open to the atmosphere and the steam cut off. Fig. 3 is a sectional rear elevation of a portion of said locomotive-engine, illustrating a short circuit on the vehicle and traveling contact-makers coacting with track-contacts for governing the operation of the automatic controlling means on the vehicle. Fig. 4 is a diagram of a portion of the railway-track controlled by an electrical block system embodying means governed by a danger condition on such track for stopping the movement of a vehicle or train. Fig. 5 is an enlarged detail illustrating in sectional plan the latch or releasable element of the automatic controller in engagement with the manual controller or throttle-lever.

Similar characters designate like parts in all the figures of the drawings.

Referring particularly to Figs. 1 and 2, I have illustrated in these views automatic controlling means on a locomotive-engine for shutting off the power and applying the brake or brakes of an air-brake system when there is a danger condition ahead of the vehicle, and I have also illustrated in these views resetting means governed by a manual controller, which is in this case the throttle-lever, for restoring the automatic controlling means to a normal position in readiness for stopping the train again in another emergency. This feature of my present invention is illustrated in connection with a locomotive deriving its power from a steam-boiler, such as 2, having the usual main steam-pipe 3 extending into the steam-dome 4 and controlled by a throttle-valve 5 for throttling the flow of steam into such pipe. Normally this throttle-valve is operated by a manual power-controller or throttle-valve controller in the form of a throttle-lever 6. The valve-stem 7 of the throttle-valve is connected at its lower end to the usual angle-lever 8, which in turn is connected to a piston-rod 9, secured to one side of a piston 10, working in a cylinder 11, the other side of said piston having secured thereto in this case a piston-rod 12, controlled by the manual power-controller or throttle-lever. Normally the piston-rod 12 will be connected to said manual controller or throttle-lever and will be operated directly thereby to actuate the throttle-valve 5. In order, however, to permit said throttle-valve to be closed automatically without the intervention of the engineer, I connect the piston-rod 12 with the manual controller or throttle-lever in this construction by an element releasable from said manual controller or throttle-lever. The device employed for this purpose is preferably a latch. (Designated generally by 13 and illustrated in detail in Fig. 5.) Here this latch consists of a pair of arms 14, pivoted about a vertical axis or pivot-pin at the end of the rod 12 adjacent to the manual controller, suitable means, such as a U-shaped spring 16, being employed for normally forcing the free ends 17 of the latch-arms into engagement with the manual controller or throttle-lever 6. The connection between said latch and the manual controller may be effected in any desired way, the controller having in this case recesses, such as 18, at opposite sides thereof, into which the rounded free ends of the latch-arms 14 slip when the throttle-lever is in the proper position. The spring 16 has sufficient power to maintain the connection between the latch and the manual controller or throttle-lever when said controller is operated manually; but the force of this spring is not sufficient to prevent disconnection of the latch from the manual controller when the piston 10 is automatically operated, as by the admission of fluid-pressure into the cylinder 11, substantially in the manner disclosed in my prior patents.

The manual controller or throttle-lever 6 may be normally locked in any desired position by the usual spring-pressed locking detent or latch 19, coacting with the toothed locking-segment 20 of the well-known construction. At its lower end the manual controller or throttle-lever is shown as pivoted to a guide-link 21, connected to a fixed point, the extreme lower end of the lever being in position to rest on and be stopped by the underlying upper wall of the boiler 2, which serves to locate the axis of the throttle-lever in the proper position when said lever is shifted into position to reëngage the latch just described forming part of the automatic controlling means.

The automatic control of the vehicle or train is preferably effected by controlling means common to the motive power and the brake system of the vehicle and substantially of the same construction as the automatic controlling means shown and described in my prior patent, No. 735,527, issued August 4, 1903. As in the construction shown in said patent, a common controlling-valve or relief-valve for the throttle-valve of a fluid-pressure engine or steam-engine and for the fluid-pressure brakes of the brake system is placed in the proper pipe of the brake system, which in this case is assumed to be an air-brake system, for the purpose of automatically releasing the air-pressure when the emergency arises, and thereby operating the brakes and also operating the throttle-valve by the air-pressure in said brake system. In this construction this automatic relief-valve is in a pipe 22, connecting the brake-pipe or train-pipe 23 with the cylinder 11 at the rear of the piston 10. The stem of this automatic relief-valve is shown at 24, and the valve itself is controlled by a segment 25, secured to said valve and meshing with a pinion 26, carrying a stop-arm 27, normally held by the armature 28 of a controlling-electromagnet 29, governed by a danger condition on the line. This electromagnet is here connected in a short circuit on the vehicle, which short circuit is controlled by a track-circuit in a manner which will be hereinafter described in detail. The parts just described are so constructed and organized as to permit the automatic relief-valve to be operated to open communication between the pipe 23 and the cylinder 11 when the stop-arm 27 is released by the armature 28. Any suitable means may be employed for effecting this movement of the valve, a spring 30 being shown herein as connected to the segment 25 and a suitable fixed point for this purpose. When said valve, its segment, and coacting parts are shifted to the positions shown in Fig. 2, the pressure in the train-pipe will be let off through the pipe 22 and the piston 10 will be moved to the left, as shown in said figure, releasing the two parts of the latch 14 from the throttle-lever without moving said lever. The movement of the piston 10 to the left in said figure will continue until the throttle-valve is closed, as shown. The fluid-pressure or air in the cylinder 11 is preferably permitted to escape through an exhaust-port in an exhaust-cock 31, similar to that shown in my said prior patent, which also permits the piston 10 to be readily returned to its normal position manually by the throttle-lever. The automatic release of the air from the pipe 23 through the pipe 22 and the cylinder 11 into the air results in the automatic application of the brakes of the vehicle or train. The manual application of such brakes under ordinary circumstances—that is, when there is no emergency condition present necessitating the automatic application just described—may be effected in the usual manner by an ordinary manual controller or brake-handle 32, connected to the usual three-way valve in a casing 33, the brake-pipe or train-pipe 23 being normally in communication through this three-way valve with a pipe 34, leading to an air-reservoir. (Not shown.)

The automatic controlling devices just described for shutting off the power and applying the brakes may be governed by any suitable means controlled by a danger condition of any kind on the line of way. In the drawings of the present application, however, for the sake of simplicity the only danger condition illustrated is the presence of another vehicle or train on a block ahead, such vehicle being indicated by the axle 35. In this view one of the tracks of a railway is illustrated, both of the rails of said track constituting in this instance sectional conductors forming parts of corresponding block-circuits. The rails of each block are designated by 36 and 37, respectively, they being connected in the construction shown in a normally closed circuit formed by a conductor 38, having a source of energy or battery 39 therein at the end of the block, and a conductor 40, having a device such as the electromagnet 41 therein for controlling a track-circuit governing the operation of another electrical device, which in this system is the automatic controlling-magnet 29 for stopping the vehicle or train. The electromagnet 41 is located at the entrance of a block, and hence governs a track-circuit at the end of the block in the rear of the block-circuit of said electromagnet.

I may make use of any suitable type of track-circuit for governing the action of the controlling-electromagnet 29, provided that this track-circuit is normally closed and includes a resistance adapted to be short-circuited—as, for example, by the moving vehicle—whether said track-circuit is or is not controlled by a block-circuit in advance thereof, it being only necessary that such track-circuit shall be capable of indicating some form of danger condition ahead of the moving train. A simple closed track-circuit having a resistance therein adapted to be short-circuited by the moving vehicle is sufficient for the purpose of governing the operation of the controlling-electromagnet 29, this track-circuit including in this case two track-contacts, such as short rails 42 and 43, in the path of one or more traveling contact-makers on the vehicle, these rails being disposed side by side and connected by a resistance 44. With this type of track-circuit two traveling contact-makers on the vehicle should coöperate, such traveling contact-makers being connected in a circuit capable of short-circuiting the resistance 44 in order to receive the full strength of the current. The preferred type of track-circuit, however, has two differentiated branches through which current having different characteristics may flow, one of these branches being in this case a high-resistance track-signal-operating branch which is normally closed and through which current normally flows for the purpose of holding a track-signal, such as a semaphore 45, in a clear position, while the other branch of said track-circuit is usually of low resistance, is normally open, and is closed only when the high-resistance branch is rendered ineffective, as by being cut out of circuit. In the system shown both of these branches are controlled by the armature 46 of the electromagnet 41, this magnet and its armature constituting a relay governing the normal controlling function and also the differentiated working or emergency function of the track-circuit, it being evident that when the closed circuit is through the working branch of low resistance a current of maximum efficiency or strength will influence the controlling-electromagnet 29 when said magnet is in the field of action of the track-circuit. Here the armature 46 is normally in contact with a terminal 47, which is connected to a conductor 48, including a track-signal-operating electromagnet 49. The conductor 48 is connected to a conductor 50, extending to the track-contact 42, the circuit being continued through the resistsance 44, the other track contact or rail 43, and a conductor 51, including a source of energy or battery 52, this conductor leading to the armature 46, which completes the circuit. When the armature 46 is released, owing to the existence of a danger condition ahead—as, for example, the presence of a train 35 on the block ahead—the armature 46 drops, thus cutting out the high-resistance track-signal-operating branch of the circuit, causing the signal 45 to move to a danger position and at the same time cutting in the low-resistance working circuit, owing to the armature 46 engaging the contact 53 practically instantaneously. The engineer of the approaching train is thus warned by the signal 45 that there is a danger condition ahead, and unless he stops his train before reaching the track-contacts 42 and 43 the working current in the track-circuit will pass through a short circuit on the train on the engagement of the traveling contact-makers on the train with said track-contacts, and the controlling-magnet 29 will be energized and the train automatically stopped by the devices hereinbefore described, practically all of the resistance of the track-circuit being eliminated at this time, owing to the short-circuiting of the resistance-coil 44 and the cutting out of the high-resistance track-signal-operating magnet 47.

A simple type of electric circuit, with its included traveling contact-makers, may be employed on the vehicle or train for coöperation with the track-circuit or track-circuits and the track-contacts shown herein. In this case this short-circuit for operating the automatic controlling means includes only the contact-making or current-collecting devices and a pair of conductors 54 and 55, leading to the controlling-electromagnet 29. Two similar contact-makers are shown in Fig. 3, these being illustrated as collecting-wheels carried by one of the forward axles, such as 56, at points between the main wheels of said vehicle. The webs 57 of these collecting-wheels are of metal and are separated from the rims 58 by insulating material 59. These collecting-wheels are journaled on the axle 56, so as to be free to turn thereon, and current is here transmitted from the rims 58 by collecting-arms or spring-contacts, such as 60, secured to collecting-rings, such as 61, fixed on but insulated from the axle 56, a small collecting-wheel 62 in contact with the collecting-ring 61 and loosely mounted on an insulated stud, such as 63, serving to transmit the current to such stud and thence to the corresponding conductor 54 or 55.

For the purpose of enabling the engineer or driver of a vehicle or train equipped with automatic controlling means of the type disclosed herein to reset the controlling mechanism on his vehicle without loss of time and proceed without unnecessary interruption of the schedule in force on the road on which his train is running I provide resetting means for restoring the automatic controlling means on the vehicle to its normal condition. This resetting means, as in my prior patent, No. 735,527, will preferably be controlled by fluid-pressure from a suitable source—as, for example, by the pressure in the air-reservoir, (not shown,) the pressure of the air being governed by a valve operated by the manual controller or throttle-lever when the engineer desires to start the vehicle or train again. This fluid-pressure controls the closing movement of the automatic relief-valve and also the resetting of all of the elements of the automatic controlling means on the vehicle in operative condition. In the construction shown a pipe 64 leads from the pipe 34, (connected with the air-reservoir,) and this pipe has at a suitable point a fluid-pressure-controlling valve 65, the other end of the pipe leading into one end of a small cylinder 66, containing a piston having a valve-resetting plunger or stem 67 secured thereto and projecting through the other end of the cylinder. On the opening of the automatic relief-valve on an operation of the automatic controlling means, as before described, the plunger 67, with its piston, will be pushed back by the segment 25 by the action of the spring 30; but when the valve 65 is opened the pressure admitted to the cylinder 66 through the pipe 64 is sufficient to overcome the pull of the spring 30 and force the segment 25 to the position shown in Fig. 1, said segment operating at such time to return the stop-arm 27 to its normal position, with the holding-face thereof in engagement with the armature or detent 28. This opening of the valve 65 is usually accomplished by the engineer when he operates the manual controller or throttle-lever to open the throttle-valve and start the vehicle or train. For the purpose of opening said valve 65 I have shown at 68 a short hooked lever resting on the stem 69 of the valve 65 and operative to open said valve by depressing said valve-stem. While the lever 6 has at the lower end thereof a by-pass actuator or pawl 70, which in moving from the wide-open to the closed position of the throtle-lever passes by the hooked end of the lever 68, but in moving from the closed to the open position forces said hooked lever down and opens the valve 65, whereupon the air is admitted through the pipe 64 into the cylinder 66, and the plunger 67 is forced out to reset the gear-segment 25 and the parts controlled thereby in the positions shown in Fig. 1.

As before stated, it is of great importance not only that the automatic controlling means shall be operated each time that there is a danger condition ahead of the vehicle or train, but also that the fact that such a danger condition has caused the operation of the automatic controlling means and has continued to govern the same until the resetting of the automatic controlling means shall be permanently recorded as a check upon the engineer or motorman. When resetting means of the type herein described is employed for permitting the restarting of a vehicle or train at the earliest practical moment after an automatic or emergency application of the controlling means has been effected, the operation of any recording means adapted to record the fact that an emergency application of the automatic controlling means has taken place and the duration of such application is greatly modified as compared with the operation of recording means included in a system in which such resetting means is not embodied. The principal reason for this is that the recording device is usually in action throughout the period in which the automatic controlling means is in the condition shown in Fig. 2, and when the elements of the automatic controlling means are quickly restored to their normal positions by resetting means governed directly by the manual controller or throttle-lever the recording means will be restored to the normal condition at the instant of resetting.

Any suitable means may be employed for recording the operations of the automatic controlling means; but I prefer to employ recording means connected in a short circuit on the vehicle, which short circuit is governed by current in the track-circuit and is adapted to short-circuit the resistance 44 in the same manner as the short circuit containing the controlling-magnet 29. As here shown, this recording means is preferably included in a parallel branch of the same electric circuit or short circuit as that which includes the controlling-magnet 29, conductors 71 and 72 being connected to the conductors 54 and 55 and including between them a device for controlling the recording means, this device being here shown as an electromagnet 73. This electromagnet is preferably part of a recording apparatus, which is inclosed in a locked casing, such as 74, the lock 75, which gives access to the contents of this casing, not being under the control of the engineer or motorman, but being capable of being unlocked only by a key or combination in the possession of a superior officer of the road. The recording means will preferably include a time-train, which in this case is secured to the back of a substantially central partition 76, said clockwork being indicated in dotted lines at 77. This clockwork serves to impart movement to a feed-roll or equivalent device for feeding a record medium, such as a web of paper 81, from one point to another. This web of paper may be in the form of a roll and may be fed from a suitable supply-point to and wound upon a receiving spindle or roll, such as 83, this latter being the feed-roll and being positively actuated by the clockwork. In its passage from the supply-point to the receiving-point the web passes over an intermediate guide-roll or supporting-roll, such as 82, at which point the record may be made thereon. This record may be made in any suitable way—as, for example, by a recording device 84 in the form of a stylus secured to one end of the armature 85 of the electromagnet 73, this armature being normally retracted by a spring 86 to hold the recording device or stylus away from the record medium. On the energization of the electromagnet 73 by the devices before described controlled by a danger condition ahead of the train the armature 85 will be attracted by the magnet and the recording device or stylus will be forced into contact with the record medium and will make a record thereon. After the electromagnet 73 has energized its armature 85 in this manner said armature should be held in this position until the resetting means operates again. The holding of this circuit may be effected by the stop-arm 27, which when in the position shown in Fig. 2 is adapted to close a circuit through a pair of contacts 87, conductors 88 and 89, and the battery 90, these conductors being connected to the conductors 71 and 72. The circuit thus closed maintains the electromagnet 73 energized until the stop-arm 27 and associated parts are restored to their normal positions by the resetting means, this circuit thus constituting a locking-circuit for maintaining the recording device in contact with the record medium.

In order to prevent tampering with the conductors of the controlling means, all of the wires before described may be run through conduits of metal or other material, if desired.

What I claim is—

1. Means for controlling the movement of a railway-vehicle, said means embodying a manual controller and an automatic controller releasable as a whole from, and normally connected to, said manual controller.

2. Means for controlling the movement of a railway-vehicle, said means embodying a manual controlling-lever and an automatic controller releasable as a whole from, and normally connected to, said manual controlling-lever.

3. Means for controlling the movement of a railway-vehicle, said means embodying a manual controlling-lever, an automatic controller, and a latch normally connected to said manual controlling-lever and said automatic controller but releasable as a whole from one of them and having a releasing movement governed by said automatic controller.

4. Means for controlling the movement of a railway-vehicle, said means embodying a source of fluid-pressure, a throttle-valve, a throttle-lever, and an automatic controller releasable as a whole from, and normally connected to, said throttle-lever.

5. Means for controlling the movement of a railway-vehicle, said means embodying a source of fluid-pressure, a throttle-valve, a throttle-lever, an automatic controller, and a latch normally connected to said throttle-lever and said automatic controller but releasable as a whole from one of them and having a releasing movement governed by said automatic controller.

6. The combination with a line of way and with a power-operated vehicle movable therealong, of manual and automatic controllers for governing the movement of said vehicle, said automatic controller being releasable as a whole from, and normally connected to, said manual controller, automatic controller-actuating means governed by a danger condition on the line of way, and automatic controller-resetting means.

7. The combination with a line of way and with a vehicle movable therealong and operated by fluid-pressure, of a throttle-valve, a throttle-lever, an automatic controller releasable as a whole from, and normally connected to, said throttle-lever, automatic controller-actuating means governed by a danger condition on the line of way, and automatic controller-resetting means governed by said throttle-lever.

8. The combination with a line of way and with a vehicle movable therealong and operated by fluid-pressure, of a throttle-valve, a throttle-lever, an automatic power-controller releasable as a whole from, and normally connected to, said throttle-lever, a brake-lever, an automatic brake-controller, means governed by a danger condition on the line of way for actuating said automatic power and brake controllers, and resetting means governing said automatic power and brake controllers.

9. The combination with a line of way and with a vehicle movable therealong, of a manual power-controlling lever, an automatic power-controller releasable as a whole from, and normally connected to, said manual controlling-lever, a manual brake-controller, an automatic brake-controller, means governed by a danger condition on the line of way for actuating said automatic power and brake controllers, and resetting means governing said automatic power and brake controllers.

10. The combination with a line of way and with a power-operated vehicle movable therealong, of manual and automatic controllers for governing the movement of said vehicle, said automatic controller being releasable as a whole from, and normally connected to, said manual controller, automatic controller-actuating means governed by a danger condition on the line of way, an automatic controller-resetting device operated by fluid-pressure, and a fluid-pressure-controlling valve governed by the manual controller.

11. The combination with a line of way and with a power-operated vehicle movable therealong, of a manual controlling-lever for governing the movement of said vehicle, an automatic controller normally connected to said manual controlling-lever and releasable as a whole therefrom by fluid-pressure and also governing the movement of said vehicle, automatic controller-actuating means governed by a danger condition on the line of way, and automatic controller-resetting means governed by the manual controller.

12. The combination with a line of way and with a power-operated vehicle movable therealong, of a manual power-controlling lever, an automatic power-controller releasable as a whole from, and normally connected to, said manual controlling-lever, a fluid-pressure brake system, a manual brake-controller, an automatic brake-controller operated by fluid-pressure from said brake system, actuating means governing said automatic power and brake controllers and governed by a danger condition on the line of way, and automatic controller-resetting means governed by the manual controller.

13. The combination with a line of way and with a power-operated vehicle movable therealong, of a manual controller for governing the movement of said vehicle, automatic controlling means governed by a danger condition on the line of way and also governing the movement of said vehicle, means for resetting said automatic controlling means, and means for recording the operations of said automatic controlling means.

14. The combination with a line of way and with a power-operated vehicle movable therealong, of a manual controller for governing the movement of said vehicle, automatic controlling means governed by a danger condition on the line of way and also governing the movement of said vehicle, manually-operated means for resetting said automatic controlling means, and means for recording the operations of said automatic controlling means.

15. The combination with a line of way and with a power-operated vehicle movable therealong, of a manual controller for governing the movement of said vehicle, automatic controlling means governed by a danger condition on the line of way and also governing the movement of said vehicle, means governed by said manual controller for resetting said automatic controlling means, and means for recording the operations of said automatic controlling means.

16. The combination with a line of way and with a power-operated vehicle movable therealong, of a manual controlling-lever for governing the movement of said vehicle, automatic controlling means governed by a danger condition on the line of way and also governing the movement of said vehicle and embodying an element releasable from, and normally connected to, said manual controlling-lever, manually-operated means for resetting said automatic controlling means, and means for recording the operations of said automatic controlling means.

17. The combination with a line of way and with a power-operated vehicle movable therealong and operated by fluid-pressure, of a throttle-valve, a throttle-lever, automatic controlling means governed by a danger condition on the line of way and also governing the movement of said vehicle and embodying an element releasable from, and normally connected to, said throttle-lever, manually-operated means for resetting said automatic controlling means, and means for recording the operations of said automatic controlling means.

18. The combination with a line of way and with a power-operated vehicle movable therealong and operated by fluid-pressure, of a throttle-valve, a throttle-lever, automatic conrolling means governed by a danger condition on the line of way and also governing the movement of said vehicle and embodying an element releasable from, and normally connected to, said throttle-lever, resetting means governed by said throttle-lever for reconnecting said throttle-lever and said releasable element of the automatic controlling means, and means for recording the operations of said automatic controlling means.

19. The combination with a line of way and with a power-operated vehicle movable therealong, of automatic controlling means governed by a danger condition on the line of way and governing the movement of said vehicle, means for resetting said automatic controlling means, recording means for recording the operations of said automatic controlling means, and a locked casing inclosing said recording means.

20. The combination with a line of way and with a power-operated vehicle movable therealong, of automatic controlling means governed by a danger condition on the line of way and governing the movement of said vehicle, means for resetting said automatic controlling means, recording means for recording the operations of said automatic controlling means, a time-train for controlling the movement of the record medium, and a locked casing inclosing said recording means and time-train.

21. The combination with a line of way and with a power-operated vehicle movable therealong, of automatic controlling means governing the movement of said vehicle, means for resetting said automatic controlling means, recording means for recording the operations of said automatic controlling means, and an electric circuit governed by a danger condition on the line of way and governing the operations of said controlling means and recording means.

22. The combination with a line of way and with a power-operated vehicle movable therealong, of automatic controlling means governing the movement of said vehicle, means for resetting said automatic controlling means, recording means for recording the operations of said automatic controlling means, and an electric circuit on the vehicle and governed by a danger condition on the line of way and governing the operations of said controlling means and recording means.

23. The combination with a line of way and with a power-operated vehicle movable therealong, of automatic controlling means governing the movement of said vehicle, means for resetting said automatic controlling means, recording means for recording the operations of said automatic controlling means, and an electric circuit governed by a danger condition on the line of way and having two parallel branches governing respectively the operations of said controlling means and recording means.

24. The combination with a line of way and with a power-operated vehicle movable therealong, of a normally closed track-circuit including a resistance, an automatic controller governing the movement of said vehicle, recording means for recording the operations of said automatic controller, and a short-circuit governing the operations of said controller and controlled by current in the track-circuit and adapted to short-circuit said resistance.

25. The combination with a line of way and with a power-operated vehicle movable therealong, of a normally closed track-circuit including a resistance, an automatic controller governing the movement of said vehicle, recording means for recording the operations of said automatic controller, and a short-circuit governing the operations of said controller and recording means and controlled by current in the track-circuit and adapted to short-circuit said resistance.

26. The combination with a line of way and with a power-operated vehicle movable therealong, of a normally closed track-circuit including a resistance, a short-circuit controlled by current in the track-circuit and adapted to short-circuit said resistance and having two parallel branches, an automatic controller governing the movement of said vehicle and governed by one of said parallel branches, and recording means, governed by the other of said parallel branches, for recording the operations of said automatic controller.

27. The combination with a line of way and with a power-operated vehicle movable therealong, of a manual controller for governing the movement of said vehicle, automatic controlling means governed by a danger condition on the line of way and also governing the movement of said vehicle, means for resetting said automatic controlling means, means for recording the operations of said automatic controlling means, and means for maintaining such recording means in action until the resetting means is operated.

28. The combination with a line of way and with a power-operated vehicle movable therealong, of a manual controller for governing the movement of said vehicle, automatic controlling means governed by a danger condition on the line of way and also governing the movement of said vehicle, means for resetting said automatic controlling means, means for recording the operations of said automatic controlling means, and means governed by such automatic controlling means for maintaining such recording means in action until the recording means is operated.

29. The combination with a line of way and with a power-operated vehicle movable therealong, of a manual controller for governing the movement of said vehicle, automatic controlling means governed by a danger condition on the line of way and also governing the movement of said vehicle, manually-operated means for resetting said automatic controlling means, means for recording the operations of said automatic controlling means, and means governed by said automatic controlling means for maintaining such recording means in action until the resetting means is operated.

30. The combination with a line of way and with a power-operated vehicle movable therealong, of a manual controller for governing the movement of said vehicle, automatic controlling means governed by a danger condition on the line of way and also governing the movement of said vehicle, means for resetting said automatic controlling means, means for recording the operations of said automatic controlling means, a time-train for controlling the movements of a record medium, and means for maintaining such recording means in action until the resetting means is operated.

31. The combination with a line of way and with a power-operated vehicle movable therealong, of a manual controller for governing the movement of said vehicle, automatic controlling means governed by a danger condition on the line of way and also governing the movement of said vehicle, means for resetting said automatic controlling means, means for recording the operations of said automatic controlling means, and means for maintaining such recording means in action until the return of the automatic controlling means to its normal position.

32. The combination with a line of way and with a power-operated vehicle movable therealong, of a manual controller for governing the movement of said vehicle, automatic controlling means governed by a danger condition on the line of way and also governing the movement of said vehicle, means for resetting said automatic controlling means, means for recording the operations of said automatic controlling means, and means for returning the recording means to its normal position on the resetting of the automatic controlling means.

Signed at New York, in the county of New York and State of New York, this 27th day of February, A. D. 1905.

FRANK E. KINSMAN.

Witnesses:
C. S. CHAMPION,
R. CHAMPION.